United States Patent [19]
Lesk et al.

[11] 3,773,221
[45] Nov. 20, 1973

[54] APPARATUS FOR THE FINE DOSAGING OF SUBSTANCES

[75] Inventors: Adolf Lesk; Ottmar Link, both of Osterburken, Germany

[73] Assignee: Adolf Zimmermann, Maschinenbau, Osterburken, Germany

[22] Filed: Dec. 29, 1971

[21] Appl. No.: 213,438

[30] Foreign Application Priority Data
Jan. 7, 1971   Germany.................. P 21 00 601.9

[52] U.S. Cl................... 222/56, 222/77, 222/226, 222/413
[51] Int. Cl............................ B65d 83/06
[58] Field of Search............ 222/195, 413, 77, 222/203, 504, 212, 213, 206, 226, 406, 56, 207

[56] References Cited
UNITED STATES PATENTS

| | | | |
|---|---|---|---|
| 2,606,645 | 8/1952 | Heine | 222/413 X |
| 3,379,345 | 4/1968 | Gehrung | 222/195 |
| 3,637,115 | 1/1972 | Holm | 222/195 |
| 2,720,341 | 10/1955 | Stirn et al. | 222/195 |
| 3,402,858 | 9/1968 | Dietert | 222/195 |
| 2,550,240 | 4/1951 | Geiger et al. | 222/77 X |
| 1,667,952 | 5/1928 | Schulze | 222/413 X |

Primary Examiner—Robert B. Reeves
Assistant Examiner—John P. Shannon
Attorney—Craig, Antonelli & Hill

[57] ABSTRACT

Apparatus for the fine dosaging of substances, more particularly substances tending to form bridges and to cake together, by means of a feed device removing the material in small quantities from a supply container, and possibly a weighing device connected thereto, characterised in that the feed device comprises a known worm which is taken laterally out of the supply container and is surrounded by an elastomeric guide tube, the guide tube supported at places by a concentric, relatively large supporting tube which is secured to the supply container. The supply container comprises a loosening floor for the material resting on it and the loosening floor consists of an air-pervious material at the underside of which air pressure impulses or blasts can be applied.

16 Claims, 3 Drawing Figures

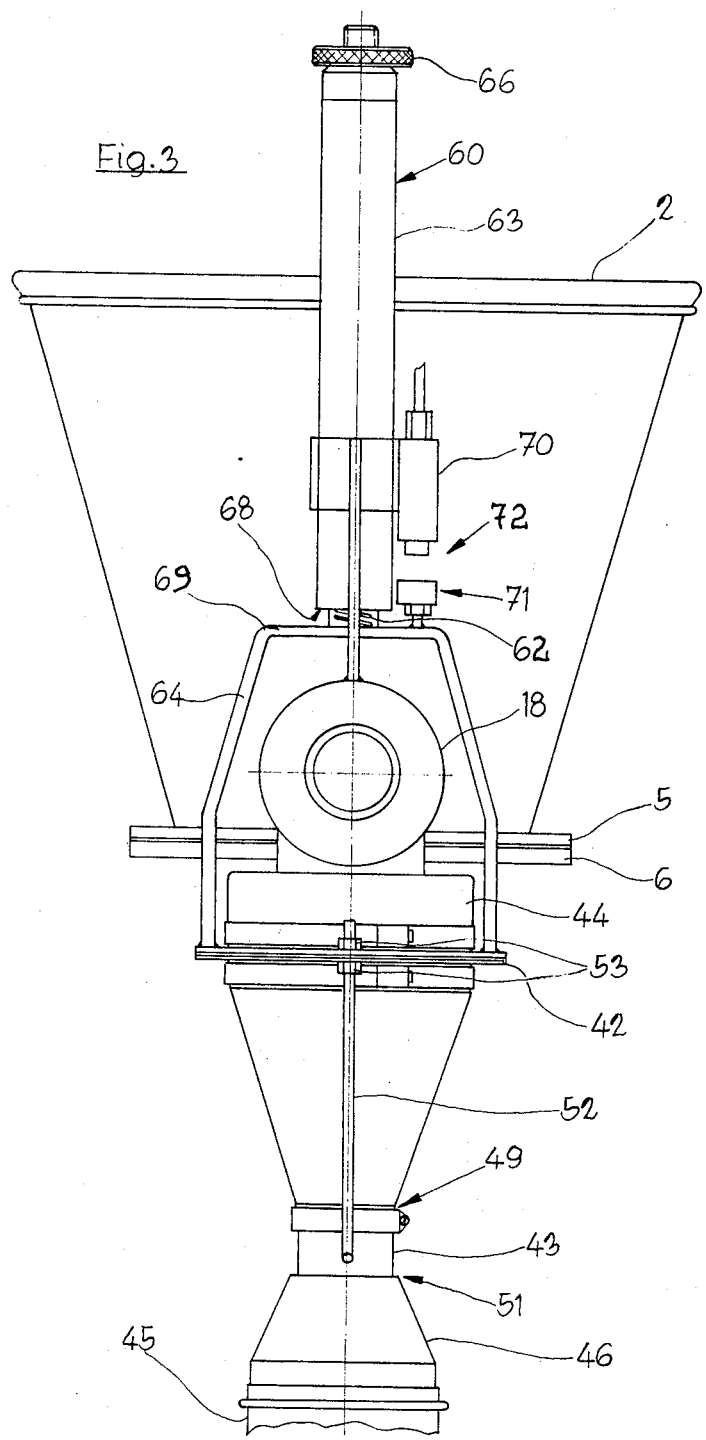

APPARATUS FOR THE FINE DOSAGING OF SUBSTANCES

The invention relates to an apparatus for the fine dosaging of solids, more particularly substances tending to bridge formation and to caking-together, by means of a feed device and possibly a weighing device connected therewith.

Such apparatus are intended for the dosaging of small and very small quantities of additives such as colouring substances and chemicals and the like in the chemical industry, vitamins, mineral substances, pharmaceutically effective substances in the foodstuffs and medicaments fields, and many others. In such cases it is important to achieve the desired weight of additives as precisely as possible, i.e., with a fluctuation range of about $\pm 1$ to $\pm 5$ percent. Of course this requires special constructional arrangements to be made in view of the small total quantity.

Thus, an apparatus is known wherein a supply container holding a comparatively large quantity is closed off at its funnel-shaped underside by a rotary plate in which a groove is formed eccentrically. When the plate rotates, the groove fills with the assistance of special filling springs, the material is transported outwardly and thrown off at the outwardly open end of the groove by a stripping element. Dosaging is permitted by the fact that the conveyed quantity is directly proportional to the rotational speed of the rotary plate.

This dosaging apparatus is of course only suitable for continuous dosaging, and for that reason is not suitable for example for very small quantities of additives, since these always have to be dosaged discontinuously. Moreover the apparatus is suitable only for absolutely dry substances, since moist material easily blocks the dosaging groove.

These disadvantages can in fact be obviated in the case of the vibrating balances which are also known, but these, like the dosaging apparatus already mentioned, have the disadvantage that solids which tend under mechanical pressure and internal or external friction to cake together or form accretions on parts of the apparatus, for instance certain metal oxides such as titanium oxide or the like, cannot be dosaged in this way. For in the case of the aforementioned apparatus this necessarily results in blocking of the feed groove, and in the vibrating balances described owing to the vibrations to which the material is subjected it results in continually increasing caking of the material. These substances, and also some non-caking substances, also tend to form bridges owing to their surface quality, i.e., on the one hand often stick to parts of the apparatus to form bridge-like structures, and on the other hand form empty caves within bulk material. This phenomenon also makes the known apparatus unsuitable for precise dosaging.

The invention has as its object so to construct an apparatus suitable for fine dosaging, of the construction described initially, that it is possible to dosage with a precision of $\pm 1$ to $\pm 5$ percent more particularly such solids as tend to form bridges and, under mechanical forces, to cake, without limiting the possibilities of use for other solids.

To solve this problem, according to the invention a number of features are used the first of which is characterised in that the feed device comprises a per se known worm which is taken laterally out of the supply container and which is surrounded by an elastomeric guide tube.

The worm, known generally for feed purposes, and used here for dosaging apparatus for the first time, provides the necessary pre-conditions for enabling substantially solids of any consistency and physical property to be taken from the supply container. The elastomeric guide tube meets the further requirement or enabling more particularly solids tending to caking to be dosaged. As the worm rotates, these substances do in fact cake on to the guide tube owing to the pressure and friction forces introduced into the material, so that a jacket of tightly compressed material gradually forms thereon, but at least after some time the guide tube expands, so that the grip of the material jacket or cylinder on the guide tube is loosened, and the material breaks up into fragments and falls into the worm feed space. If a rigid guide tube were used here, as is usual, the worm would become blocked up after a short time.

The invention thus solves in a surprisingly simple and striking manner this problem which occurs in taking material from a supply container.

In order to give the guide tube the necessary stability, and on the other hand not to impair elasticity, the guide tube is locally supported by a concentric, larger supporting tube which is secured to the supply container.

Since the material contained in the supply container may form caves in the case of substances which have a tendency to form bridges and to cake, removal of material might be effected in an undesirably non-uniform manner. Therefore, it is proposed according to the invention that the supply container comprises a loosening floor for the material resting on it. This loosening floor consists, in the case of one preferred constructional form, of an air-pervious material, at the underside of which air pressure blasts can be applied. For example, this loosening floor forms the upper closure of a chamber into which a compressed-air conduit debouches. The compressed-air conduit comprises control means for producing pressure impulses with a duration of about 1/10 s.

The air flowing through the loosening floor at short intervals of time loosens the material continually and keeps it in a state suitable for transporting, so that bridges and caves cannot form within the material. Very fine-powdered material behaves like fluids, i.e., flows about. On the other hand, this prevents pressure or friction forces from acting on the material, which might give rise to caking. The short-duration pressure impulses on the one hand keep the air requirements small, and on the other hand prevents dust accumulation in the air issuing above from the supply container.

The apparatus described hereinbefore is intended primarily for continuous fine dosaging, but can also be used in conjunction with a weighing device for discontinuous dosaging. However, conventional weighing devices are not suitable with the solids being dealt with specially here, i.e., which tend towards bridge formation and caking.

Therefore, according to another feature of the invention it is proposed that the weighing device has a weighing container made of elastomeric material, whose shape varies automatically by using the elasticity at the time of emptying. In a preferred constructional form the weighing container consists of a downwardly narrowing, longitudinally clamped flexible rubber tube whose lower end is adapted to be closed by being pinched together.

This avoids having corners and angles within the weighing container, which readily lead to bridge formation in the material.

The material taken from the supply container by the worm falls into the flexible rubber tube which is closed at its lower end and whose weight increase is measured by weighing. When the desired weight is attained, the worm is stopped by means of a limit switch of the balance. By opening the flexible tube, which can also be initiated by the limit switch, the material can fall down out of the weighing device. Since the flexible tube alters its form owing to its elasticity during the opening movement, any material sticking to the wall also falls out. If this should ever fail to happen in the case of strongly adhesive material, complete emptying is achieved by opening and closing the tube several times. In this way even material which has caked on can be detached.

A weighing container of this kind can also be used independently of the apparatus described hereinbefore, in conjunction with other appliances or apparatus.

In a convenient embodiment of the weighing container, which operates in the manner of a tube pinching valve, the flexible tube is taken at its lower end through a rigid ring which is connected to a compressed-air conduit. Between the ring and the flexible tube there is arranged an elastomeric sleeve which can be acted upon by compressed air and which is connected to the rigid ring in airtight manner. In the opened state, sleeve and flexible tube abut on the ring at the inner side. When compressed air flows into the ring, the sleeve expands inwardly and, in so doing, takes with it the flexible tube end situated in the ring, until said end is pinched together and the tube is closed. On opening, the reverse procedure takes place, the entire flexible tube changing from a downwardly conical to a frusto-conical form and, owing to its rigid fixing - contracting as a whole. The deformation and the contraction at the same time guarantee complete detaching of sticking material, and any bridges within the material in the flexible tube are eliminated.

The clamping or restraining of the flexible tube in the longitudinal direction is conveniently produced between the rigid ring and a flange holding its upper end, for example by inserting a possibly adjustable clamping rod between the ring and the flange.

The weighing container consisting of flexible tube and closing mechanism is preferably dust-tight, but connected to the feed device so as to be capable of independent movement, and suspended on a preloadable spring balance. The adjustable preloading of the balance spring makes it possible to limit the spring motion substantially independently of the total weight of a few grams weight, with the result that even with considerable weights on the one hand the weighing container carries out only small travel movements, and on the other hand the same measurement accuracy is obtained as with relatively small weights.

This construction makes it possible to separate the weighing container very easily from the remainder of the apparatus, to permit either continuous dosaging or cleaning of the weighing container.

Since on the one hand the dosaging apparatus is to be capable of being used for various kinds of solids, whereas on the other hand it is never possible to prevent entirely the sticking of micro-particles to the apparatus parts, the invention also proposes that the supply container and the feed device is capable of being separated from the remainder of the apparatus, and interchanged with another supply container, so that the apparatus can be converted for a different product within a short space of time.

Not least for this purpose, the feed worm is connected to the drive at the discharge side by way of a free coupling, and the supporting tube surrounding the worm guide tube is releasable from the air-tight connection of the weighing container. This connection is constructed for example as a housing, into one end of which the worm debouches, to whose other end the driving motor is flange-connected, and to whose underside the weighing container is connected. Both the supply container with feed worm and also the weighing container are releasable from this housing, to which the spring balance may also be flange-connected.

The free coupling required for this purpose between worm and drive can be provided by arranging that the feed worm is driven by a driver element which extends through the housing interior and is arranged on the driving shaft of the motor. A construction which is also advantageous in view of the special solids discussed here comprises forming the feed worm of a helical spring whose discharge-side end turn is bent radially outwards to form an abutment, against which the rotating driver element runs. The winding of the helical spring and the rotation direction of the driver element are so adapted to one another that the helical spring is pressed into the guide tube on rotational movement.

Finally, if the supporting tube is inserted in sealing-tight manner into one end flange of the housing, the supply container can be removed without difficulty from the housing along with supporting and guide tubes, and the conveying spring removed.

The housing with flange-connected motor and balance can thus be retained both for continuous and for discontinuous dosaging, whereas the weighing container can selectively be fitted or removed, likewise the supply container, for the purpose of cleaning and interchanging.

Further features, details and advantages of the invention will become apparent from the following description of a preferred constructional form and also with the help of the drawings wherein:

FIG. 3 shows a side view of the complete apparatus (seen from the left in FIG. 1).

Figure 1:
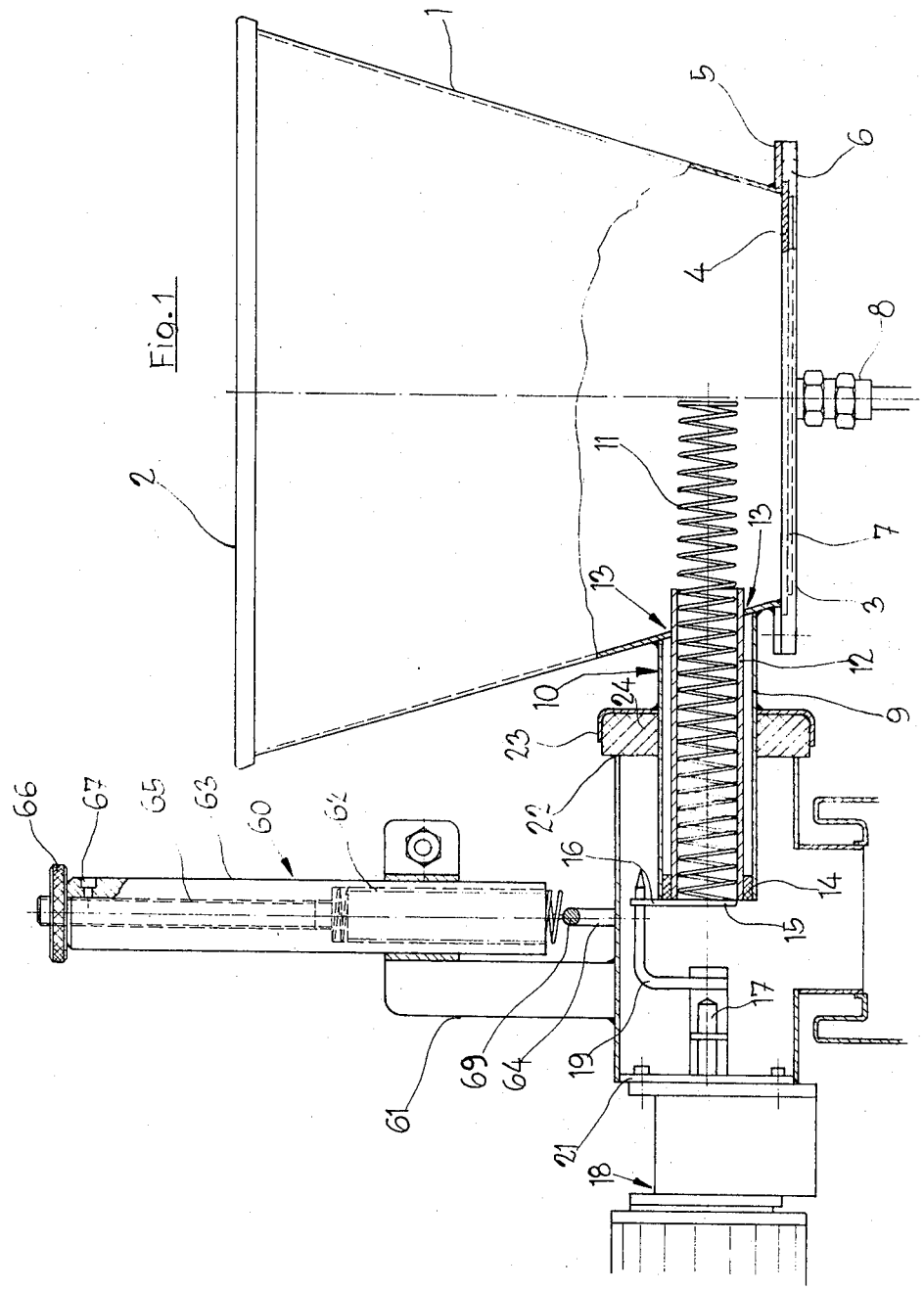
FIG. 1 shows a longitudinal section through the supply container, the feed device and the housing connected in air-tight manner, omitting the weighing container connected to the bottom of the housing, for reasons of drawing clarity.

The main parts of the dosaging apparatus comprise the supply container 1, the material-removing feed device 10, a housing 20, a weighing container 40 and a balance 60.

The supply container 1, equipped with conical walls, is closed at the top with a cover or flap 2 and at its underside with a floor 3. Above the floor 3 there is arranged a loosening floor 4, between the container flange 5 and the floor flange 6. This loosening floor 4, made of an air-pervious and possibly elastic material, forms together with the container floor 3 a chamber 7 into which debouches a compressed-air conduit 8. The compressed air entering the chamber 7 in pulsed fashion is distributed below the loosening floor 4 and flows into the material contained in the supply container 1.

Welded laterally to the supply container 1 is a rigid tube 9 which extends substantially horizontally and within which the material-removing feed device 10 is arranged. This comprises a feed worm 11 which projects into the supply container 1 and in the illustrated constructional example is constructed as a helical spring. This helical spring is surrounded over at least part of its length by an elastomeric guide tube 12 which is supported at the container wall at 13 and on the tube 9 by way of a ring 14. The end turn 15 of the helical spring 11 at the discharge end thereof is bent up in a radial outward direction to form an abutment 16. A finger-like driver element 19 arranged on the driving shaft 17 of a motor 18 runs against this abutment 16 on rotational movement. In this way a free coupling is provided between the driving motor 18 and the feed-action helical spring 11. The winding of the helical spring 11 and the rotation of the motor 18 are so adapted to one another that the helical spring is pressed into the container during conveyance. The material contained in the container is thereby entrained in small quantities, since substantially only the turn diameter contributes effectively to conveyance. As soon as material cakes to the inner wall of the elastomeric guide tube owing to the friction introduced into the material by the worm, the said guide tube expands, with the result that after a short time the material is fragmented off again. The parts of the apparatus described hereinbefore suffice for continuous dosaging, the quantity taken by the helical spring 11 from the supply container 1 being directly proportional to the rotational speed of the driver element 19 or the rotational speed of the driving motor 18.

The driving motor 18 is flange-connected to one end face 21 of the housing 20. At the opposite end 22 the housing is closed in dust-tight manner by a cover 23 and a foam rubber sealing element 24. The cover 23 and the foam rubber sealing element 24 are arranged with the supporting tube 9, welded to the supply container 1, extending through them, so that the material-removing feed device 10 opens into the housing 20 and can be separated together with the supporting tube 9 and the supply container 1 by pulling in the direction of the helical spring axis from the housing 20. This separation is also permitted by the free coupling at driver element 19 - abutment 16.

Figure 2:
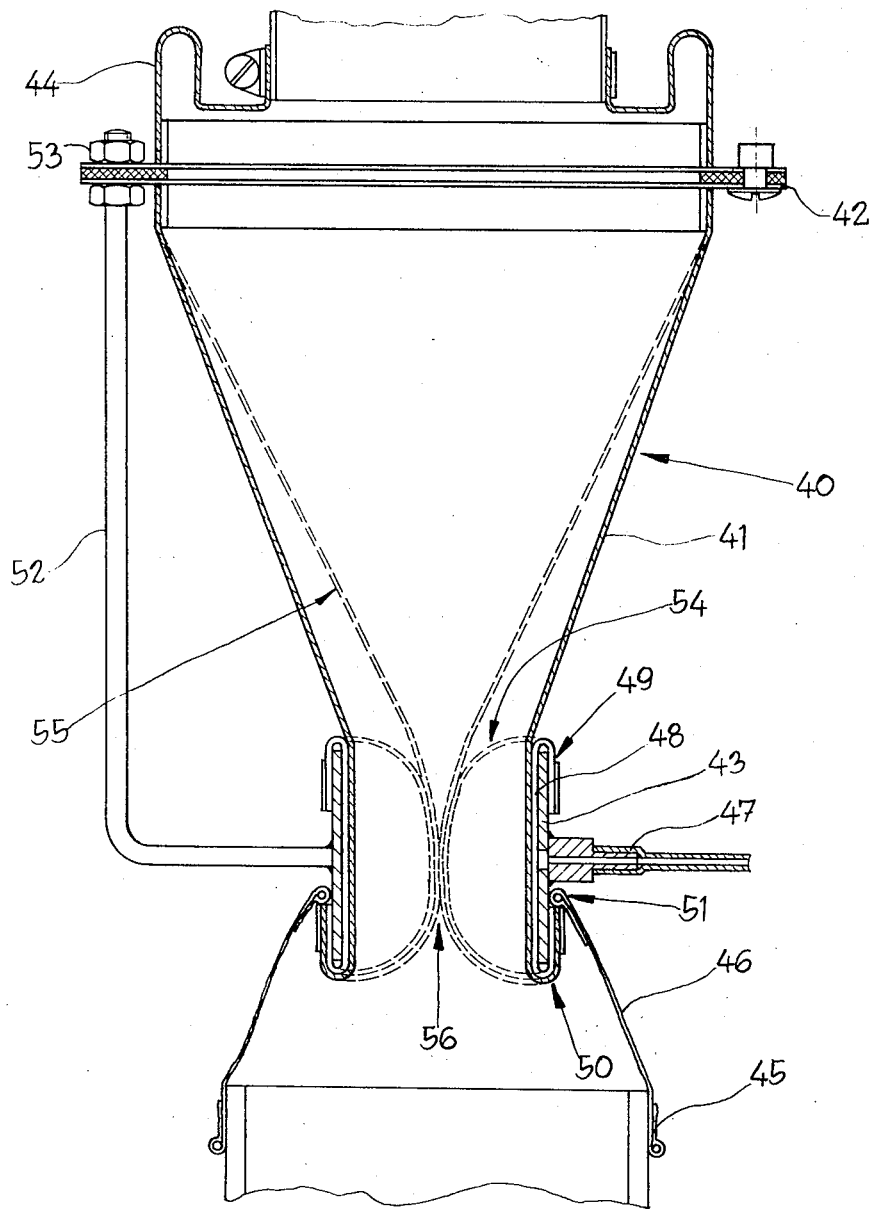
FIG. 2 shows a longitudinal section through the weighing container connected below to the housing shown in FIG. 1, on a larger scale relatively to that of FIG. 1

At the underside of the housing 20 the weighing container 40 shown in more detail in FIG. 2 is connected in air-tight fashion. This weighing container consists more particularly of a longitudinally clamped flexible rubber tube 41. This flexible rubber tube 41 is held at its top end by a flange 42 whereas its lower end is surrounded by a rigid ring 43. In order to enable a weighing movement to be carried out independently of the housing 20, the flange 42 is connected to the housing by way of an elastic connecting element 44. Likewise the connection between the weighing container 40 and a container 45 collecting the weighed-out material is constituted by an elastic connection 46, for example a filter cloth or the like, in order to permit movement of the weighing container 40 in this respect also.

The rigid ring 43 at the lower end of the flexible tube 41 has a compressed-air connection 47. Arranged in the ring 43 is an elastic rubber sleeve 48 which is arranged at the outer side at 49 in air-tight fashion on the ring 43. The lower end 50 of the flexible tube 41 is taken through the ring 43 and fixed at 51 to its outer side.

To subject the flexible tube 41 to restraint in the longitudinal direction there is used a clamping rod 52 which is attached to the ring 43 and whose other end is secured to the flange 42 in such a manner as to be adjustable by means of a nut 53 or the like.

To weigh a predetermined quantity of material first of all compressed air is forced into the interior of the ring 43 through the compressed-air connection 47. The sleeve 48 lifts away from the ring 43 and moves into the position 54 shown in broken lines. With this movement, at the same time the flexible tube 41 is moved from the open position indicated in full lines in FIG. 2 into the closed position 55 shown in broken lines, the flexible tube being pinched together with a sealing effect in the region of its lower end at 56. After attainment of the desired weight the sleeve 48 is relieved, so that it and the flexible tube move back into their initial position, whereupon the weighing container is open in the downward direction and the weighted-off material can fall into the container 45.

For weighing, there is used in the illustrated constructional example the weighing device which is given the general reference numeral 60 in FIGS. 1 and 3, which is secured to the housing 20 by means of an arm 61. In the illustrated constructional example the weighing device is constructed as a spring balance whose spring 62 is arranged in a housing 63. A bowed arm 64 arranged at the flange 42 of the weighing container 40 is suspended in this spring. At its upper end the spring is secured to a spindle 65 which is taken outwards through the tube 63 and is vertically adjustable by means of a knurled nut 66 or the like. The set position can be secured by a further screw 67. If the knurled nut 66 is rotated so that the spindle 65 moves upwards out from the housing, after a specific travel distance the transverse bar 69 of the bowed arm 64 strikes against the lower end 68 of the tube 63. By further turning of the knurled nut 66 the spring can be given a certain preload, which can be read off for example as a weight from a graduation. This preload is set with different desired weights, to limit the travel occurring during weighing and thus the travel of the weighing container 40 to a narrow measurement range in the vicinity of the desired total quantity. As soon as the preload is overcome the travel of the spring 62 or the weighing container 40 begins, with the result that the limit switch given the general reference numeral 72 closes and stops the driving motor 18 of the feed worm 11. The limit switch 72 is advantageously a dust-insensitive magnetic switch one part 70 of which is arranged on the tube 63 or arm 61 and the other part 71 on the transverse bar 69 of the bowed arm 64.

The weighing container 40 intended for discontinuous dosaging can readily be released from the housing 20, so that the apparatus can be converted at any time from continuous to discontinuous operation and vice versa.

I claim:

1. An apparatus for the precise dosaging of accretion-like and bridging-type materials comprising a supply container for containing one of an accretion-like and a bridging-type material, loosening floor means disposed at the bottom of the supply container for dislodging the material lying on the floor, a feed worm projecting from a side of the supply container for conveying the material from the supply container, an elastomeric guide tube arranged concentrically about the feed worm for expansion by materials forming on walls of the guide tube, the materials formed on the walls being fragmented off by the expansion of the tube, and a weighing device operatively connected to an output end of the feed worm for controlling the feed worm in response to a predetermined amount of material conveyed by said feed worm, said weighing device including an elastomeric weighing container wherein precise dosaging of accretion-like and bridging-type material is obtained in a batchwise manner by feeding predetermined amounts of the material from the supply container to the weighing device by controlled operation of the feed worm.

2. Apparatus according to claim 1, in which the guide tube is supported by a concentric, relatively large supporting tube secured at one end to the supply container and connected at a second end to the guide tube by means of a ring clamp.

3. Apparatus according to claim 1, in which the loosening floor includes an air-previous material at the underside of which air pressure impulses or blasts may be applied.

4. Apparatus according to claim 3, in which the air-pervious loosening floor forms the upper closure of a chamber into which compressed-air conduit opens.

5. Apparatus according to claim 4, in which the compressed-air conduit comprises control means for producing pressure impulses with a duration of about 1/10 s.

6. Apparatus according to claim 1, in which the weighing container consists of a flexible rubber tube which narrows in the downward direction, and is clamped in the longitudinal direction, and the lower open end of which tube is adapted to be closed by pinching.

7. Apparatus according to claim 6, in which the flexible rubber tube at its lower end is taken through a rigid ring connected to a compressed-air conduit, while between the ring and the flexible tube there is an elastomeric sleeve which is adapted to have compressed air admitted to it and which is connected in air-tight manner to the rigid ring.

8. Apparatus according to claim 7, in which the flexible rubber tube is adapted to be clamped between the rigid ring and a flange which holds its upper end.

9. Apparatus according to claim 8, in which between the rigid ring and the flange a clamping rod is inserted.

10. Apparatus according to claim 1, in which the weighing device is operatively connected to the feed worm in dust-tight manner.

11. Apparatus according to claim 1, in which the weighing container is suspended on a spring balance which is subjected to a preload.

12. Apparatus according to claim 1, in which the feed worm is connected at the output end by way of a free coupling to means for driving the feed worm.

13. Apparatus according to claim 12, in which the means for driving includes a driver element extending from a driving shaft of a motor to the free coupling.

14. Apparatus according to claim 13, in which the feed worm is formed of a helical spring having an output-region end turn bent up radially outwardly to form an abutment against which the driver element abuts.

15. Apparatus according to claim 1, further comprising means for driving the feed worm and in which the weighing device includes means for controlling the means for driving.

16. Apparatus according to claim 15, in which said means for driving includes a motor, and said means for controlling includes switch means for deenergizing the motor in response to predetermined amounts of material being received by the weighing container.

* * * * *